(12) United States Patent
Yamagiwa et al.

(10) Patent No.: US 8,060,240 B2
(45) Date of Patent: Nov. 15, 2011

(54) INJECTION MOLDING CONTROL METHOD

(75) Inventors: Yoshitoshi Yamagiwa, Nagano (JP); Takayoshi Shioiri, Nagano (JP); Eiki Iwashita, Nagano (JP)

(73) Assignee: Nissei Plastic Industrial Co., Ltd (JP)

( * ) Notice: Subject to any disclaimer, the term of this patent is extended or adjusted under 35 U.S.C. 154(b) by 627 days.

(21) Appl. No.: 11/975,282

(22) Filed: Oct. 18, 2007

(65) Prior Publication Data

US 2008/0099943 A1  May 1, 2008

(30) Foreign Application Priority Data

Oct. 27, 2006  (JP) ............................... P2006-293065

(51) Int. Cl.
*B29C 45/76* (2006.01)
(52) U.S. Cl. .................. 700/203; 700/200; 264/40.5
(58) Field of Classification Search .................. 700/48, 700/52, 197, 200, 202, 203; 264/40.1, 40.3, 264/40.5, 40.6
See application file for complete search history.

(56) References Cited

U.S. PATENT DOCUMENTS

| | | | | |
|---|---|---|---|---|
| 5,671,335 A | * | 9/1997 | Davis et al. | 706/25 |
| 5,914,884 A | * | 6/1999 | Gur Ali et al. | 700/200 |
| 6,839,608 B2 | * | 1/2005 | Sarabi et al. | 700/48 |
| 6,845,289 B2 | * | 1/2005 | Salewski et al. | 700/200 |
| 2006/0224540 A1 | * | 10/2006 | Shioiri et al. | 706/23 |

FOREIGN PATENT DOCUMENTS

JP  2005335078  12/2005

* cited by examiner

*Primary Examiner* — Charles Kasenge
(74) *Attorney, Agent, or Firm* — Adams & Wilks

(57) ABSTRACT

A method for controlling injection molding using a neural network in a control device of an injection molding machine. A measurement monitor value is acquired in a measurement step during test injection molding and an injection monitor value is acquired in an injection step. The acquired measurement monitor value is designated as an input term and the injection monitor value is designated as an output term. A prediction function that incorporates the measurement monitor value is then determined using the neural network. A first value corresponding to the injection monitor value is predicted by substituting into the prediction function a measurement monitor value acquired at completion of a measurement step during mass-production injection molding. On the basis of the predicted first value, a second value corresponding to an injection condition is determined. Injection control and pressure maintenance control are then implemented on the basis of the second value corresponding to the injection condition.

13 Claims, 15 Drawing Sheets

INJECTION MOLDING CONTROL METHOD

FIELD OF THE INVENTION

The present invention relates to a method for controlling an injection molding machine through the use of a control device that includes a neural network.

BACKGROUND OF THE INVENTION

The quality of a product obtained in an injection molding machine for producing a product by performing a plasticizing/measurement process (hereinafter referred to as a measurement process) and an injection/pressure maintenance process (hereinafter referred to as an injection process) is dependent on the injection conditions, and it is therefore important that the injection conditions be adjusted so that a satisfactory product is obtained.

The injection conditions include V-P switching control for switching the screw control from speed control to pressure control, and a technique for obtaining a satisfactory product by correcting the V-P switching position is disclosed in JP 2005-335078 A.

The injection conditions during the abovementioned injection molding will be described hereinafter with reference to the graph of FIG. 18 hereof.

In FIG. 18, the horizontal axis indicates the screw position, and the vertical axis indicates the injection pressure or the injection rate.

The reference symbol Ps indicates the curve of the injection pressure when a satisfactory product is obtained, P indicates the curve of the injection pressure in a certain shot, and V1 through V3 indicate lines that show the injection rate.

The screw position when the pressure curve Ps changes to the screw position correction detection pressure Pm is indicated by "A," the screw position when the pressure curve P in a certain shot changes to the screw position correction detection pressure Pm is indicated by "a," and a deviation of α (wherein α=A−a) exists between the two positions.

At this time, the speed of the screw switches from V1 to V2 (or V2 to V3) in the b positions (2 positions) that are offset by an amount equal to α from the B positions (two positions). Speed control is then switched to pressure maintenance control in the c position that is offset by an amount equal to α from the C position.

Since the pressure curve P of a certain shot can be made to imitate the pressure curve P that produces a satisfactory product by correcting the screw position by an amount equal to α, a satisfactory product can also be obtained in the certain shot.

In FIG. 18, the sequence of operations whereby the deviation α is detected after St, which is the starting point of the injection process, and the speed switching point or the speed-pressure maintenance switching point is corrected by an amount equal to the deviation α is performed within the injection process.

In recent high-speed molding methods, approximately 0.1 second elapses from the start St of the injection process to the start c of pressure maintenance control. The sequence of operations described above is difficult to perform in such a short time, and even if these operations could be performed, a high-sensitivity sensor or a control unit capable of performing high-speed computation is necessary, and device costs increase.

In JP 2005-335078 A, only the relationship between the injection pressure and the screw is managed. In this configuration, a satisfactory product becomes difficult to obtain when the temperature of the heating cylinder, the cycle time, and other factors fluctuate. Specifically, multiple fluctuating factors must be considered in order to obtain a satisfactory product.

SUMMARY OF THE INVENTION

It is therefore an object of the present invention to provide an injection molding method that enables high-speed molding, and that can take multiple fluctuating factors into account.

According to the present invention, there is provided a method for controlling injection molding using a neural network in a control device of an injection molding machine, wherein the injection molding control method comprises the steps of acquiring a measurement monitor value in a measurement step during test injection molding, and an injection monitor value in an injection step, designating the acquired measurement monitor value as an input term and the injection monitor value as an output term, and determining a prediction function using the neural network that incorporates the measurement monitor value; predicting a first value that corresponds to the injection monitor value by substituting the measurement monitor value that was acquired at completion of the measurement step during mass production injection molding into the prediction function; determining a second value that constitutes an injection condition on the basis of the predicted first value; and implementing injection control and pressure maintenance control on the basis of the second value corresponding to the injection condition.

In this inventive arrangement, the injection conditions are determined by a prediction function determination step, a first value prediction step, and a second value prediction step, but the prediction function determination step is implemented by a test molding, and the first value prediction step and second value prediction step are implemented by a measurement step.

Specifically, the injection conditions that are predicted for mass-production molding are determined prior to the injection step. Since there is no need for computation in the injection step, injection can be performed at high speed. The computations that accompany the first value prediction step and the second value prediction step are performed in a measurement step that has a time margin. There is therefore no need to increase the computation speed, and the cost of the control device can be prevented from increasing. As a result, the present invention can be implemented by a control device that is mounted in a conventional injection molding machine, and the cost of the injection molding machine can be prevented from increasing.

A plurality of measurement monitor values can also be designated as input factors by employing a prediction function using a neural network. Specifically, injection conditions that reflect multiple fluctuating factors can be determined. As a result, improved quality can easily be attained in the manufactured product.

The measurement monitor value in the test injection molding and the mass-production injection molding preferably includes at least one of a measurement starting position corresponding to a screw position of a screw of the injection molding machine at the start of measurement, a measurement time that is a time from the start of measurement to the end of measurement, a measurement torque that is a twisting torque applied to the screw, a cycle time that is a single cycle time from the start of measurement in a certain test molding to the start of measurement in a subsequent test molding, a measurement stop position that is a screw position at the end of measurement, and a heating cylinder temperature that is the average value of the heating cylinder temperature in a measurement. Accordingly, injection conditions that reflect multiple fluctuating factors can be determined, and improved quality can thereby easily be attained in the manufactured product.

The injection monitor value is preferably an injection starting position of the screw. The injection starting position of the screw is extremely important in the injection step. The quality of the manufactured product is improved by predicting such an injection starting position for the screw.

The injection monitor value is preferably an injection pressure measurement value measured when the screw has reached a prescribed position. When a backflow prevention valve is provided to the screw, the injection pressure is unstable until the backflow prevention valve closes. Therefore, the injection monitor value is the injection pressure measurement value when the screw reaches a prescribed position, and the pressure stably increases.

The second value is preferably a V-P switching position at which speed control of the screw is switched to pressure maintenance control. The V-P switching position is extremely important in the injection step. The quality of the manufactured product is improved by predicting such a V-P switching position.

The second value is preferably a maintained pressure for the pressure maintenance control. The maintained pressure is extremely important in the injection step. The quality of the manufactured product is improved by predicting such a maintained pressure.

Preferably, the control method further comprises a step of comparing the predicted first value with the injection monitor value that was acquired at the end of the injection step during the mass-production injection molding, and confirming whether a difference between the values is within an allowable range. The present invention aims to predict injection conditions so as to obtain a satisfactory product, but since a prediction is involved, there is the possibility of an unsatisfactory product occurring. Therefore, the accuracy of the injection conditions is monitored by comparing the predicted first value with the injection monitor value that was acquired at the end of the injection step.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
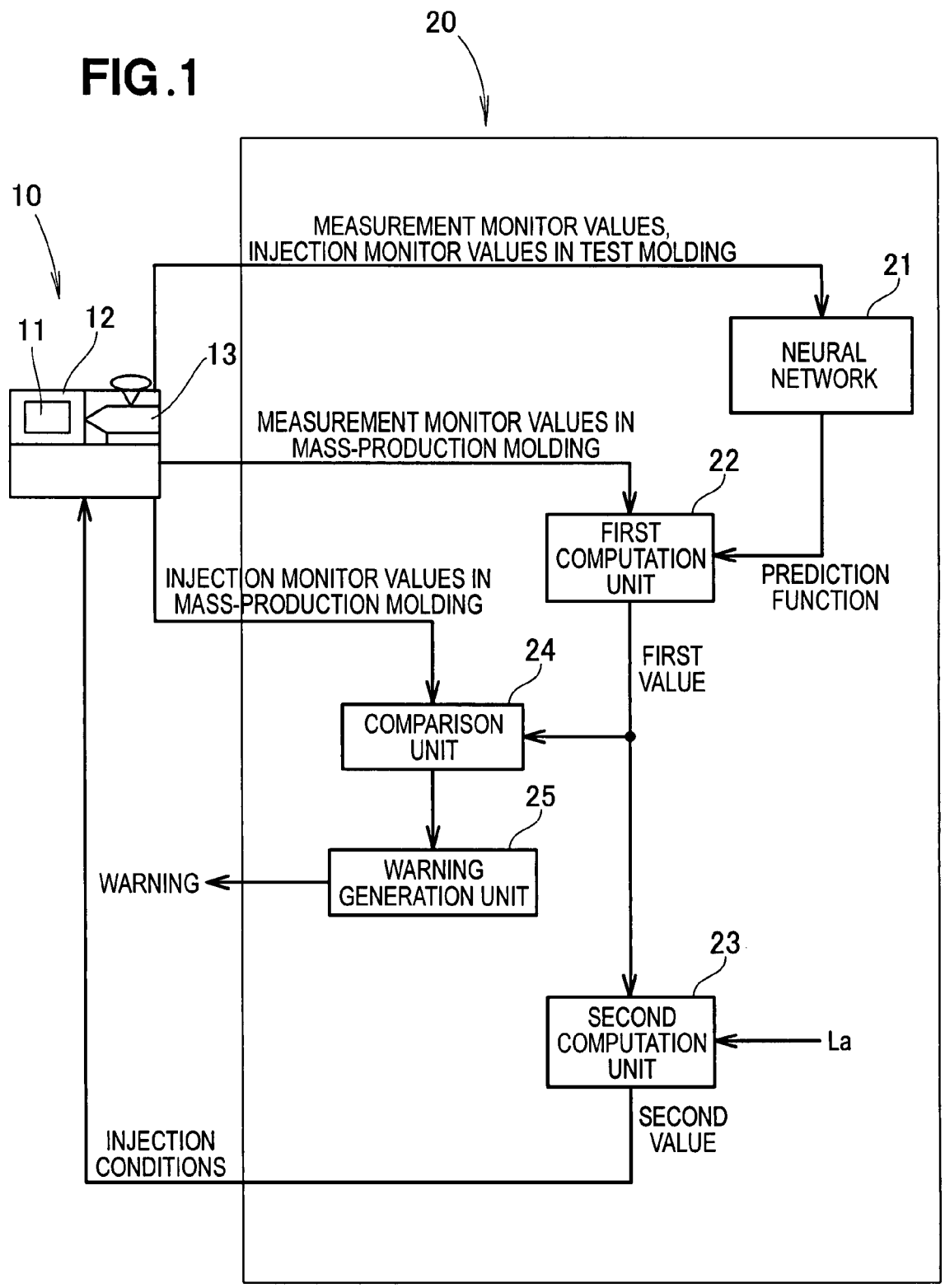
FIG. 1 is a block diagram showing an injection molding machine in conjunction with its control device according to the present invention.

As shown in FIG. 1, the injection molding machine 10 is basically comprised of a mold clamping device 12 for clamping a die 11, and an injection device 13 for injecting a resin into the die 11. The injection molding machine 10 is provided with a control device 20 that includes a neural network.

The control device 20 includes a neural network 21 for incorporating a measurement monitor value and an injection monitor value of a test molding performed by the injection molding machine 10 and generating a prediction function; a first computation unit 22 for computing a first value on the basis of the prediction function generated by the neural network 21, and the measurement monitor value of a mass-production molding performed by the injection molding machine 10; a second computation unit 23 for computing a second value that corresponds to injection conditions on the basis of the first value that was computed by the first computation unit 22; a comparison unit 24 for comparing the first value with an injection monitor value of the mass-production molding performed by the injection molding machine 10; and a warning generation unit 25 for generating a warning signal when the comparison value of the comparison unit 24 is not normal.

Figure 2:
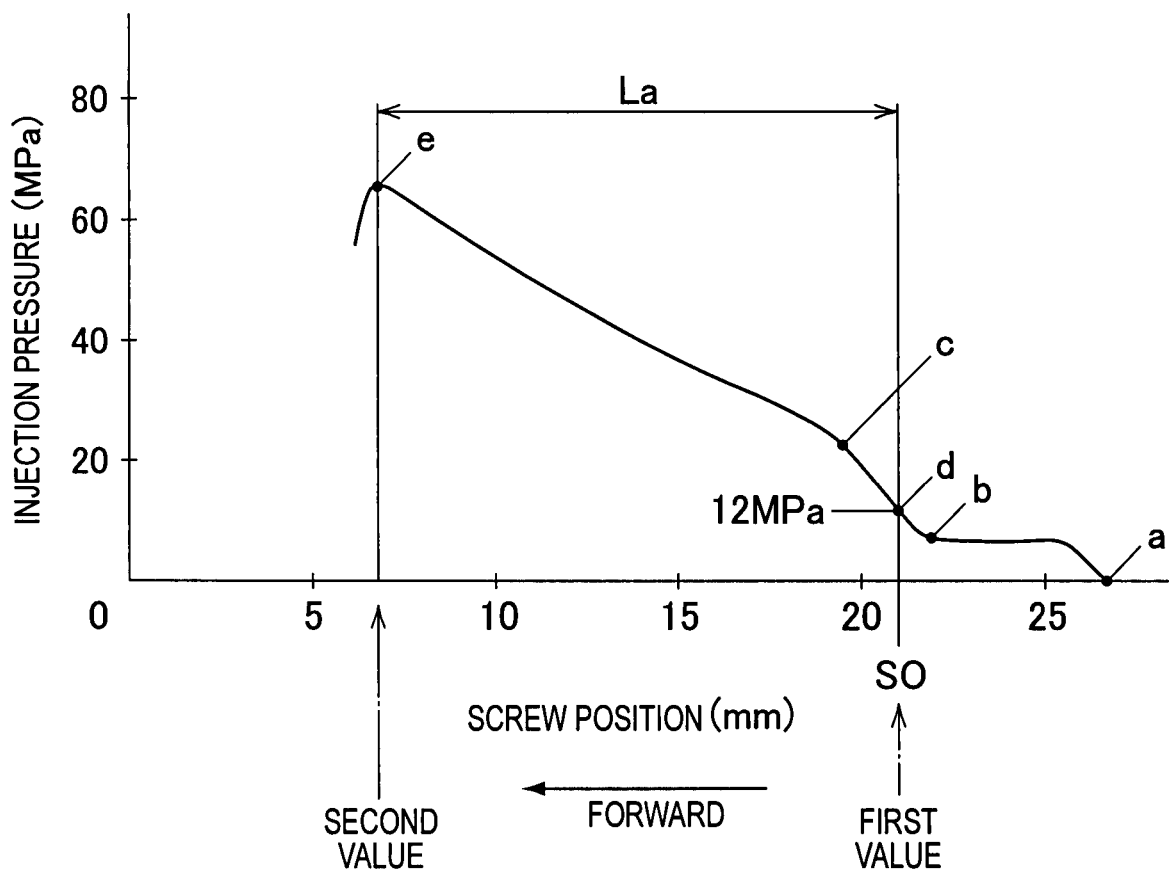
FIG. 2 is a graph showing a relationship between the screw position and the injection pressure.

Specific examples of the first value and second value described above will next be described based on the graph shown in FIG. 2 that shows the relationship between the screw position and the injection pressure. In FIG. 2, the screw moves forward from right to left on the horizontal axis. A pressure curve that descends to the right occurs when a satisfactory product is obtained.

Even when the screw begins to move forward at point a, there is almost no increase in pressure up to point b. This is because the backflow prevention valve is not completely closed. The backflow prevention valve is completely closed near point b, and the injection pressure increases linearly to point c. Since the injection pressure is stable and does not increase at point d (12 MPa) between point b and point c, point d is defined as the injection starting position S0. The injection starting position S0 corresponds to the "first value" of the present invention.

A satisfactory product is then obtained at point e where V-P switching control is performed. Point e corresponds to the "second value" of the present invention. The reference symbol La is the amount of forward movement of the screw when the injection starting position S0 is the origin.

The operation of the injection molding machine having the configuration described above will next be described.

Figure 3:
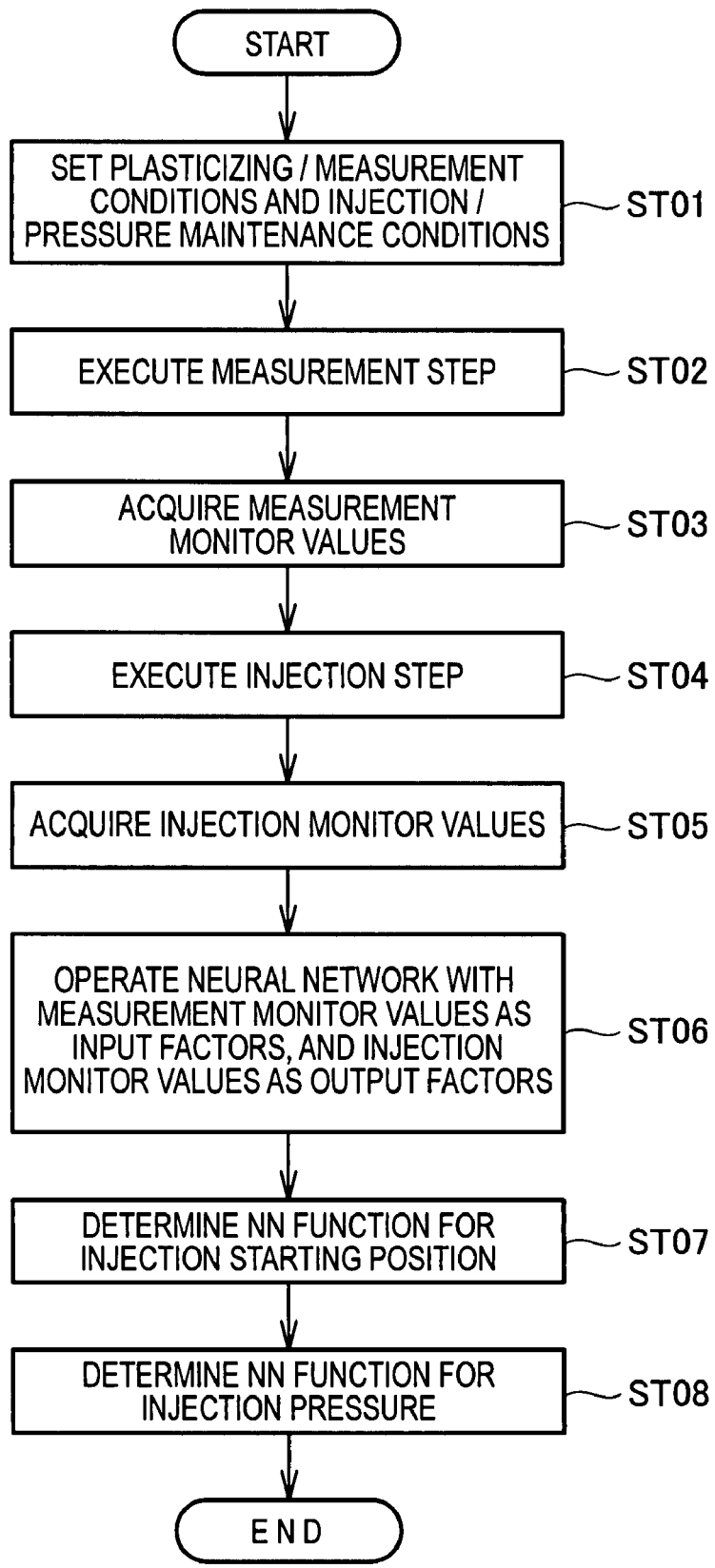
FIG. 3 is a flowchart showing the method for determining the prediction function in test molding.

FIG. 3 is a flow diagram showing the method for determining the prediction function in test molding.

In step (hereinafter abbreviated as ST) 01, the plasticizing/measurement conditions and the injection/pressure maintenance conditions are set in the control device of the injection molding machine.

In ST02, the measurement step in test molding is performed.

In ST03, measurement monitor values are acquired from the sensors that are mounted in the injection molding machine.

In ST04, the injection step in test molding is performed.

In ST05, injection monitor values are acquired from the sensors that are mounted in the injection molding machine.

In ST06, the neural network is operated. This operation is described in FIG. 4.

Figure 4:
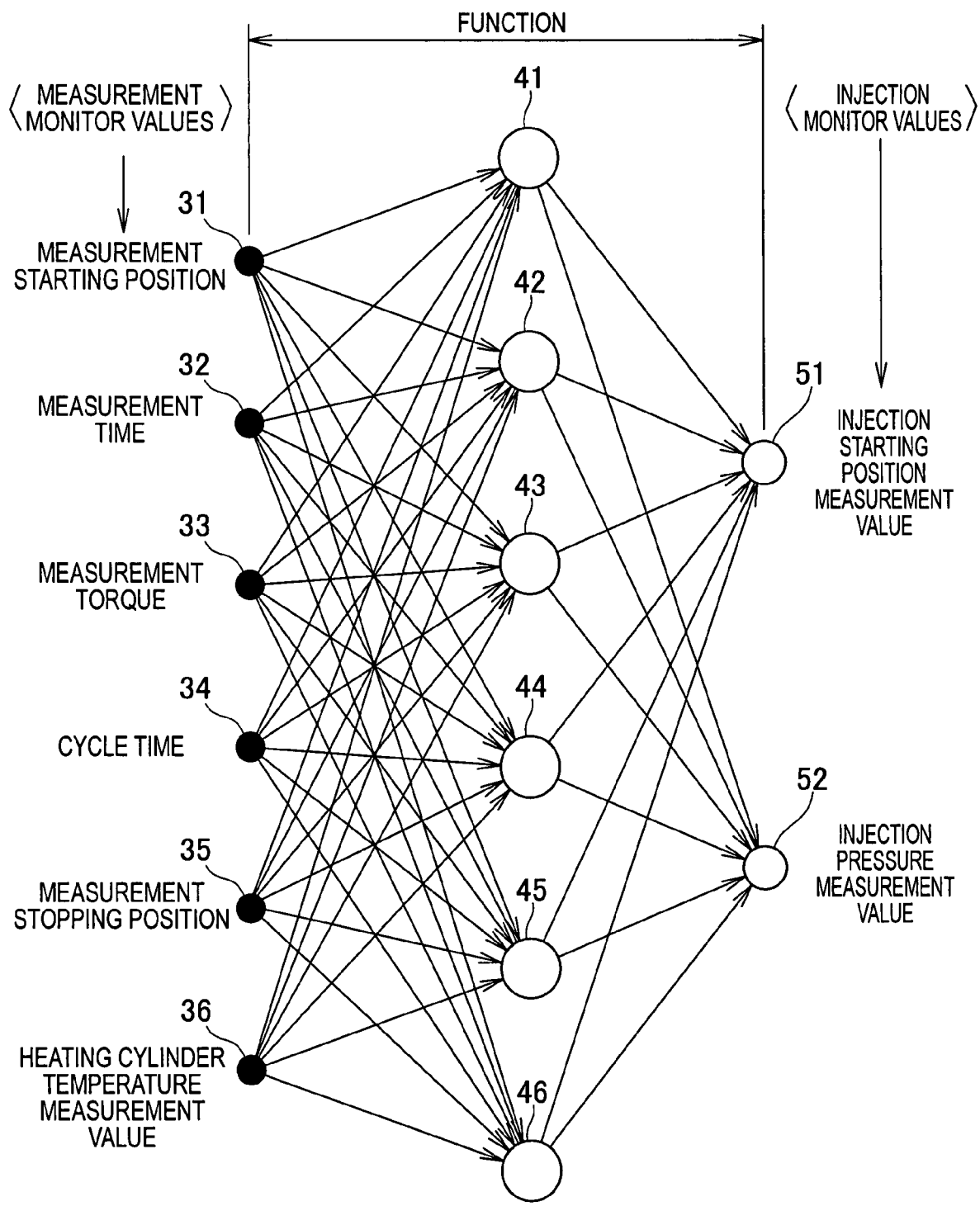
FIG. 4 is a diagrammatical view showing a neural network for use in the present invention.

In FIG. 4, during test molding, the measurement monitor values obtained by detection of the operating state of the injection molding machine by the sensors, e.g., a measurement starting position (screw position at the start of measurement), a measurement time (time from the start of measurement to the end of measurement), a measurement torque (twisting torque applied to the screw), a cycle time (single cycle time from the start of measurement in a certain test molding to the start of measurement in a subsequent test molding), a measurement stop position (screw position at the end of measurement), and a heating cylinder temperature (average value of the heating cylinder temperature in a measurement), are designated as input factors 31, 32, 33, 34, 35, 36.

The value of an intermediate layer 41 is determined by processing the input factors 31, 32, 33, 34, 35, 36 using a threshold value and a weighting coefficient that is determined for each input. The value of an intermediate layer 42 is determined by processing the input factors 31, 32, 33, 34, 35, 36 using another threshold value and a weighting coefficient that is determined for each input. The values of the intermediate layer 43 through 46 are determined in the same manner.

Output factors 51, 52 are determined by processing the values of the intermediate layers 41 through 46 using another threshold value and a weighting coefficient that is determined for each input. The output factors 51, 52 are the injection monitor values obtained through detection of the operating state of the injection molding machine by the sensors during test molding, e.g., the injection starting position measurement value (see point d in FIG. 2) or the injection pressure measurement value (the injection pressure (discussed later in relation to FIGS. 9 and 14) at the screw position determined at the end of the injection step).

Since the neural network is a function, the input factors 31 through 36 and the output factors 51, 52 can be designated as known values, and the weighting coefficients and threshold values in the function can be designated as unknown values.

Specifically, the measurement monitor values are applied to the input factors 31 through 36, and the injection monitor values are applied to the output factors 51, 52. Computation is repeated by a computer while adjusting the weighting coefficients and the threshold values until the output factors 51, 52 match the injection monitor values. The weighting coefficients and the threshold values are determined when the output factors 51, 52 satisfactorily match the injection monitor values.

Returning to FIG. 3, the NN (abbreviation for neural network; the same hereinafter) function for the injection starting position is determined in ST07, and the NN function of the injection pressure is determined in ST08.

The flow of operations described above is performed in test molding.

The flow of operation in mass-production molding will next be described.

Figure 5:
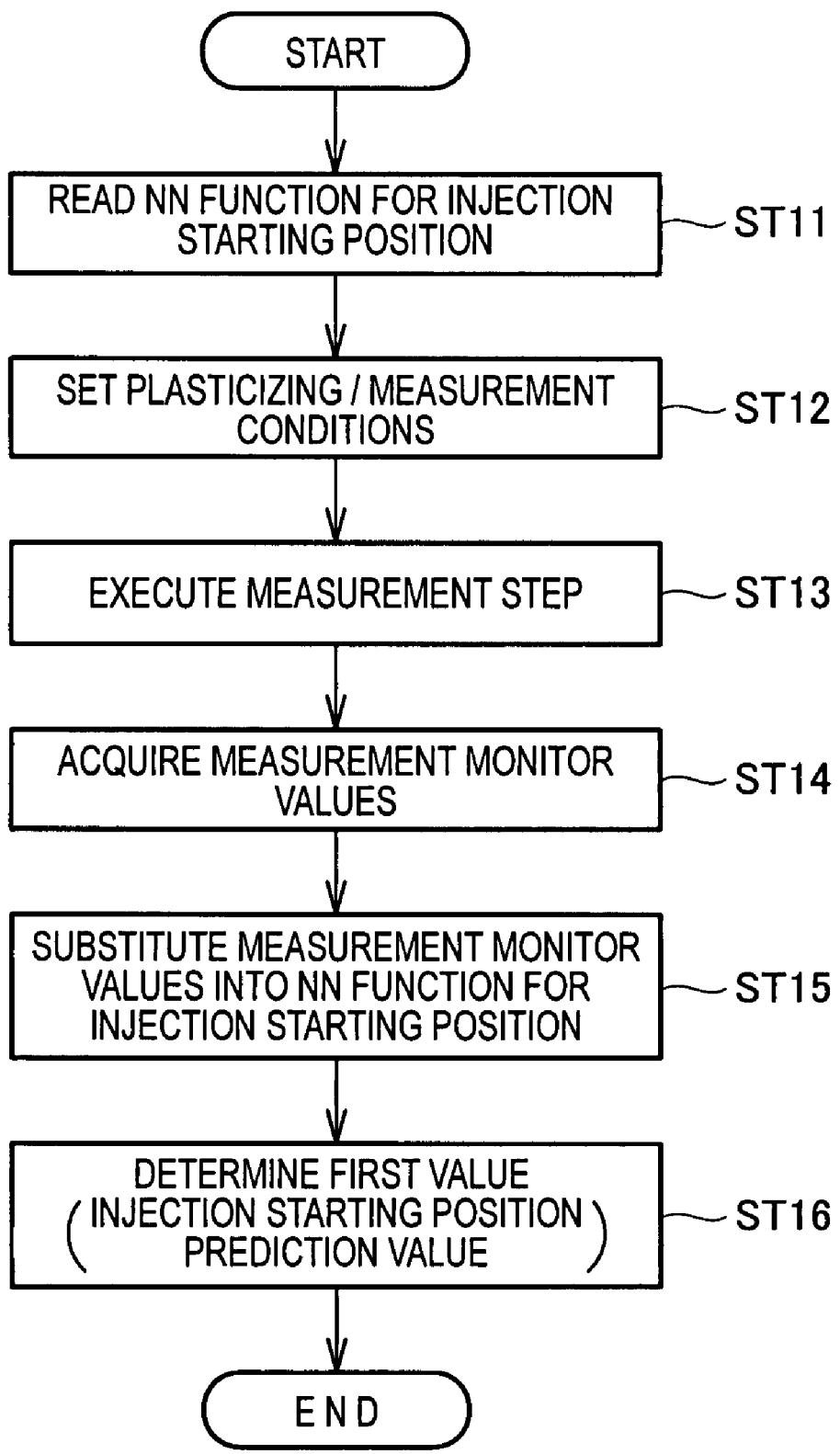
FIG. 5 is a flowchart for determining a first value in mass-production molding.

FIG. 5 is flow diagram showing the method for determining the first value in mass-production molding.

In ST11, the NN function for the injection starting position is read. (This step can be omitted when FIGS. 3 and 5 are continuous. The same applies for consecutive flow diagrams.

In ST12, the plasticizing/measurement conditions are set for mass-production molding.

In ST13, the measurement step for mass-production molding is performed.

In ST14, the measurement monitor values are acquired at the end of the measurement step.

In ST15, the measurement monitor values are substituted into the NN function for the injection starting position. This step is described in FIG. 6.

Figure 6:
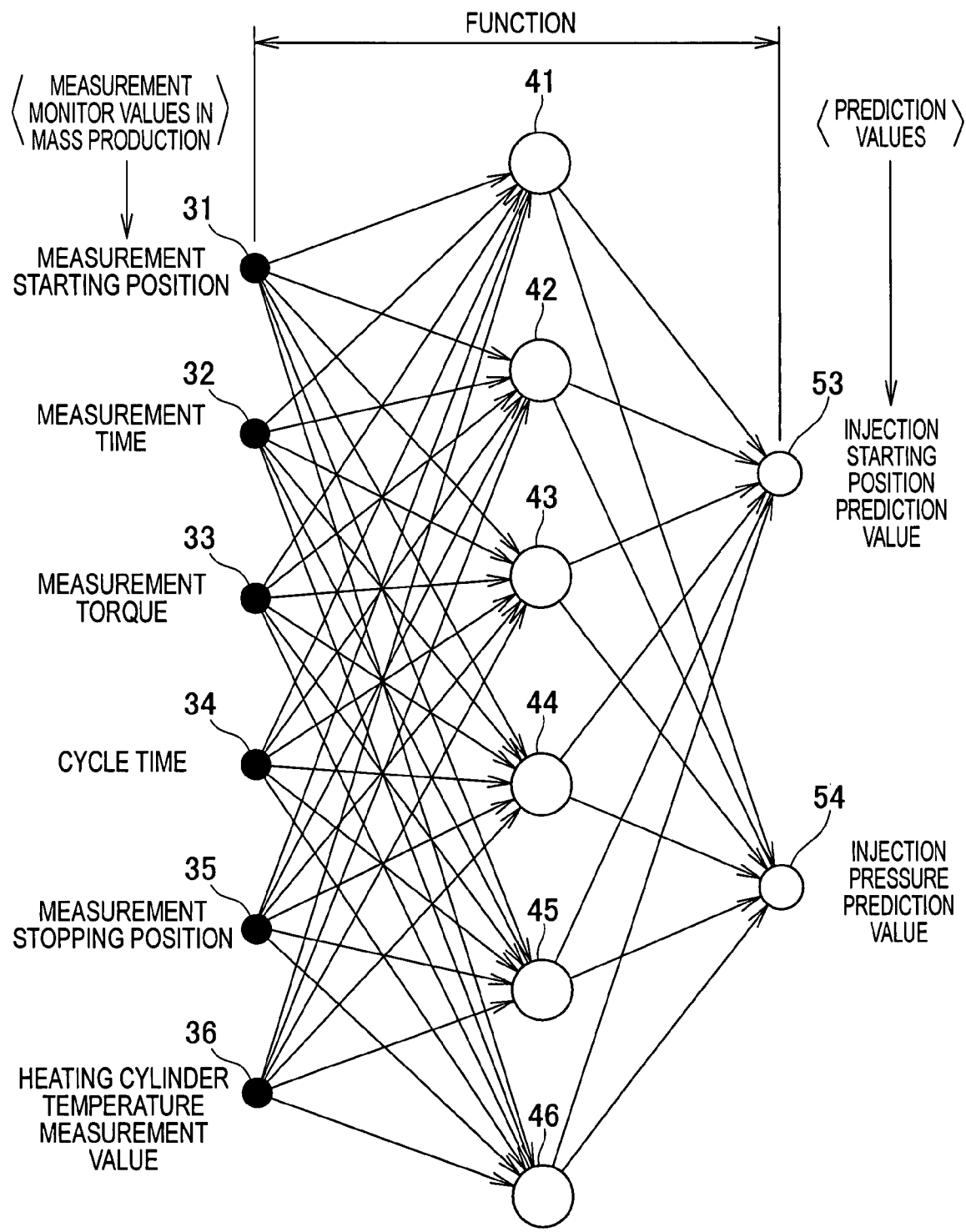
FIG. 6 is a diagrammatical view showing the neural network in mass-production molding.

FIG. 6 is a diagram showing the method for using the neural network in mass-production molding. The measurement monitor values obtained in mass-production molding are inputted as the input factors 31 through 36. Since the values of the intermediate layers 41 through 46 are determined, the output factor 53 (injection starting position prediction value as the first value) can be calculated.

Returning to FIG. 5, the first value (injection starting position prediction value; see point d in FIG. 2) is determined in ST16.

Figure 7:
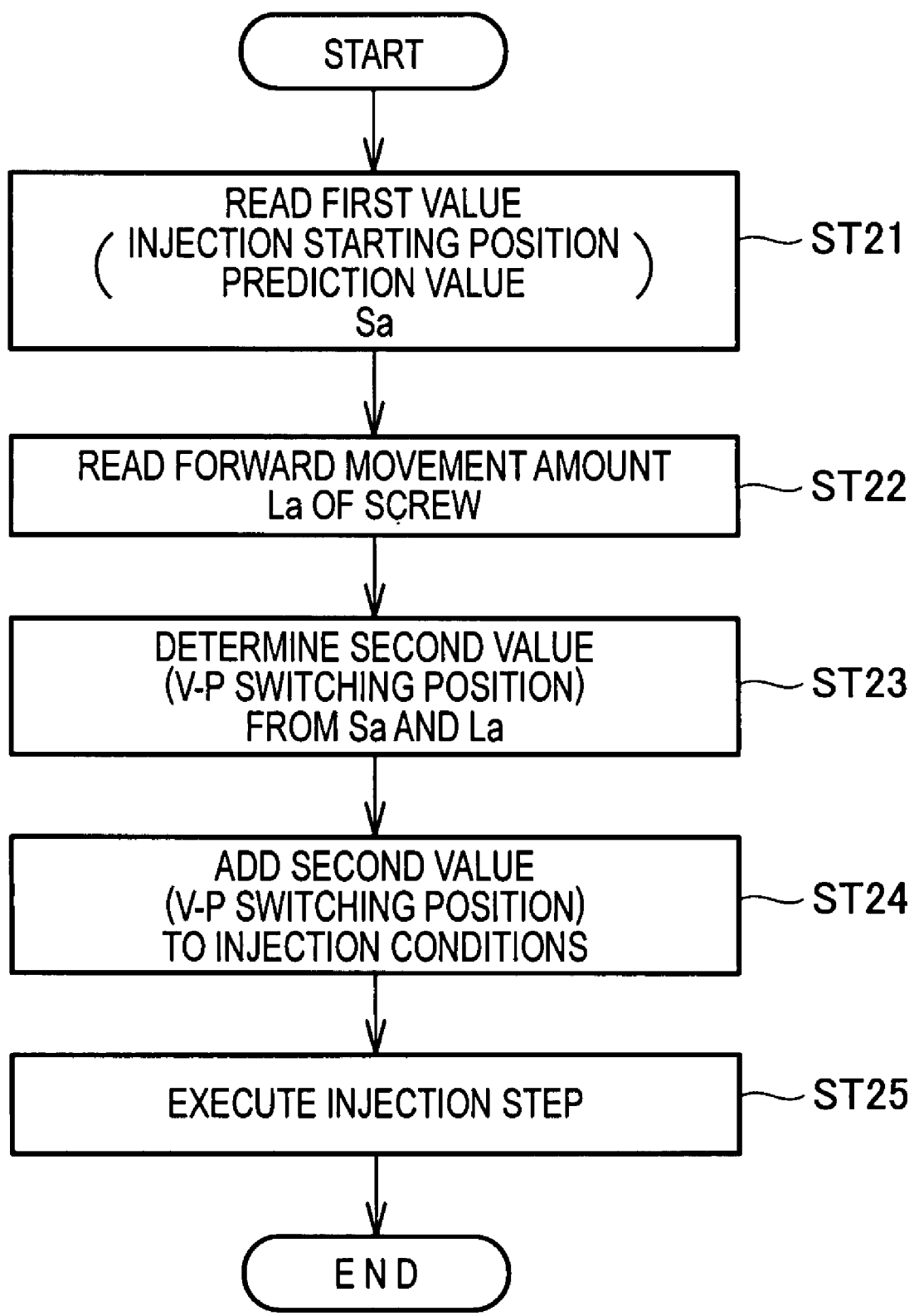
FIG. 7 is a flowchart showing the method for determining the V-P switching position in mass-production molding.

FIG. 7 is a flow diagram showing the method for determining the V-P switching position in mass-production molding.

In ST21, the first value (injection starting position prediction value) is read. The injection starting position prediction value will be referred to as Sa. This Sa corresponds to S0 in FIG. 2.

In ST22, the forward movement amount La (see FIG. 2) of the screw is read.

In ST23, the second value (V-P switching position, which corresponds to point e in FIG. 2) is determined from Sa and La.

In ST24, the second value (V-P switching position) is added to the injection conditions. The injection step (ST25) is performed while V-P switching control is performed in the V-P switching position.

The measurement step in the mass-production molding is performed in FIG. 5 described above, and the injection step in mass-production molding is performed in FIG. 7, but repeated calculation and other calculation that takes time is not performed. Consequently, mass-production molding can be performed at high speed.

Figure 8:
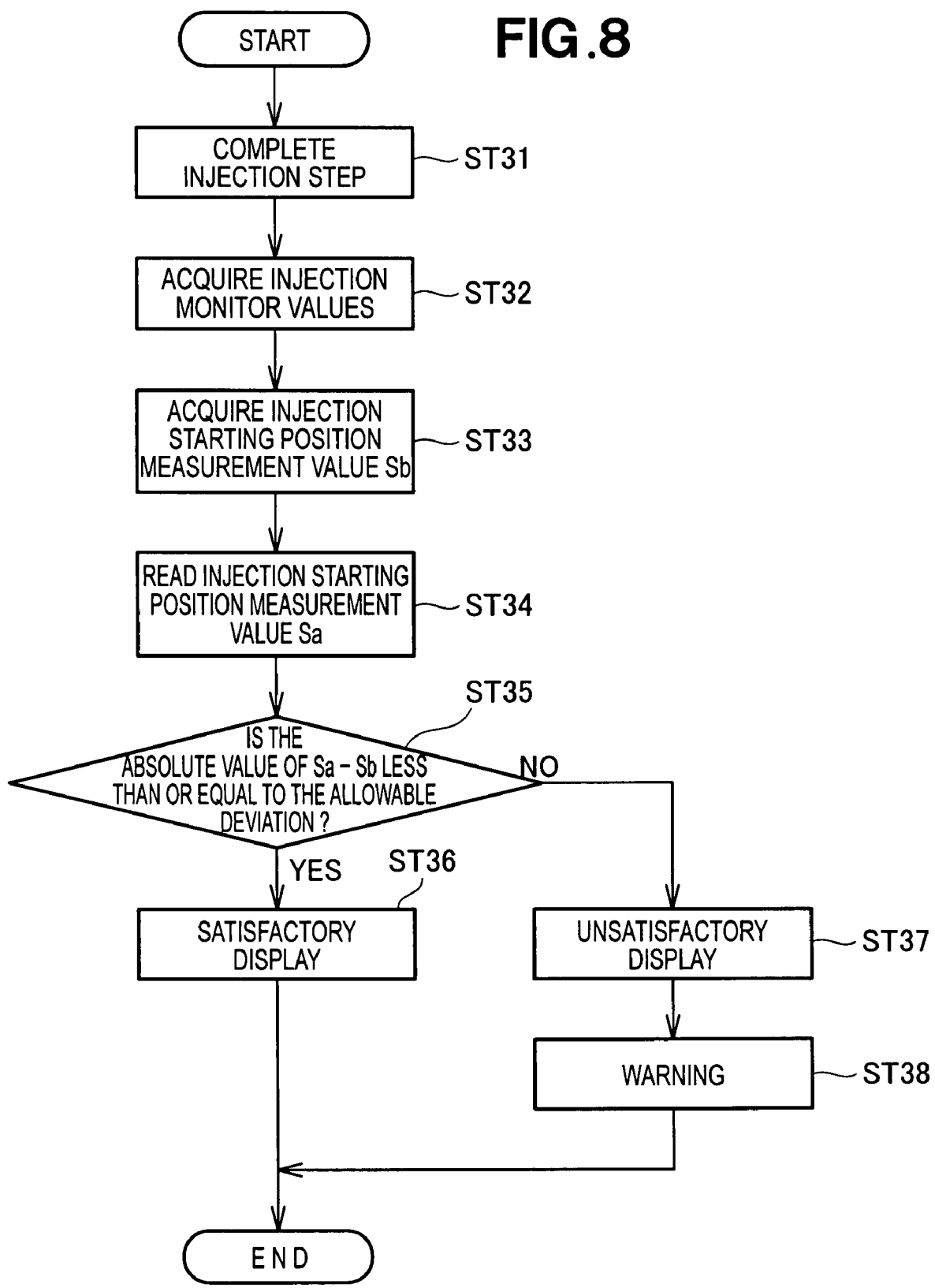
FIG. 8 is a flowchart showing a confirmation step in mass-production molding.

FIG. 8 is a flow diagram showing the confirmation step in mass-production molding.

When the injection step is completed in ST31, the injection monitor values are acquired in ST32, and the injection starting position measurement value Sb is acquired in ST33 from among the injection monitor values.

In ST34, the injection starting position prediction value Sa that is the first value is read.

The difference between Sa and Sb is calculated in ST35, and an assessment is made as to whether the difference is within an allowable deviation. The process proceeds to ST36, and "satisfactory display" is performed when the difference is within the allowable deviation. When the difference exceeds the allowable deviation, the process proceeds to ST37, "unsatisfactory display" is performed, and a warning is generated in ST38.

The accuracy of the injection conditions is monitored by comparing the predicted first value with the injection monitor value that is acquired at the completion of the injection step.

The first value was the injection starting position prediction value in the example described above, but the first value may also be another injection condition. An example will next be described of a case in which the first value is the injection pressure prediction value.

The graphs that are required for implementation of this example will first be described.

Figure 9:
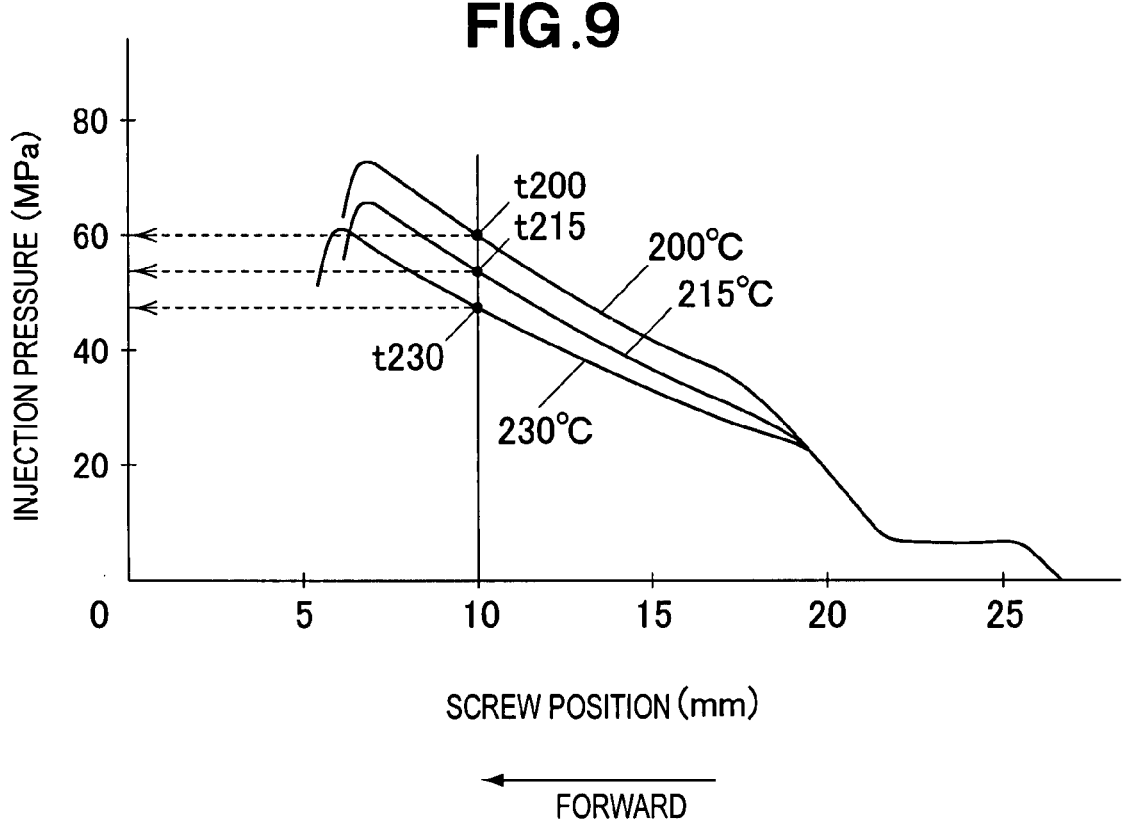
FIG. 9 is a graph showing a relationship between the screw position and the injection pressure.

FIG. 9 is a graph showing the relationship between the screw position and the injection pressure. When the heating cylinder temperature is set to 200° C., 215° C., or 230° C., and the injection pressure is examined while other conditions are kept constant, three curves are obtained. The resin is polypropylene (PP).

Since an inflection point occurs near 7 mm on the horizontal axis, comparison of the three curves at this point is not preferred. Therefore, 10 mm is selected as a position that is not affected by the inflection points, and the three curves are compared at the 10 mm point.

The points at which a line drawn parallel to the vertical axis from the 10 mm point intersects with the curves are designated as t200, t215, and t230, and the scale (injection pressure) of the vertical axis is read for each point.

Figure 10:
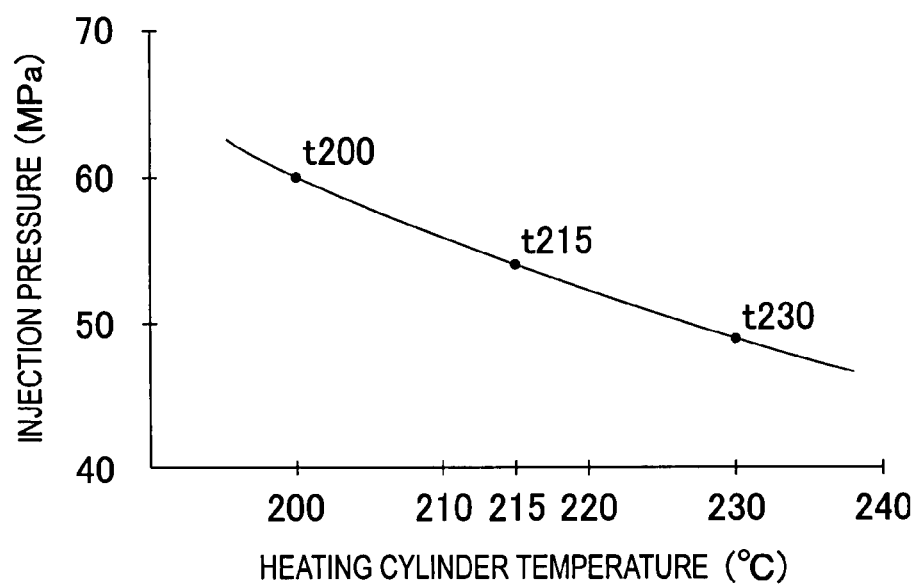
FIG. 10 is a graph showing a relationship between the heating cylinder temperature and the injection pressure.

FIG. 10 is a graph showing the relationship between the heating cylinder temperature and the injection pressure. The points t200, t215, and t230 obtained in FIG. 9 are plotted to create a graph that shows the relationship between the heating cylinder temperature and the injection pressure.

Figure 11:
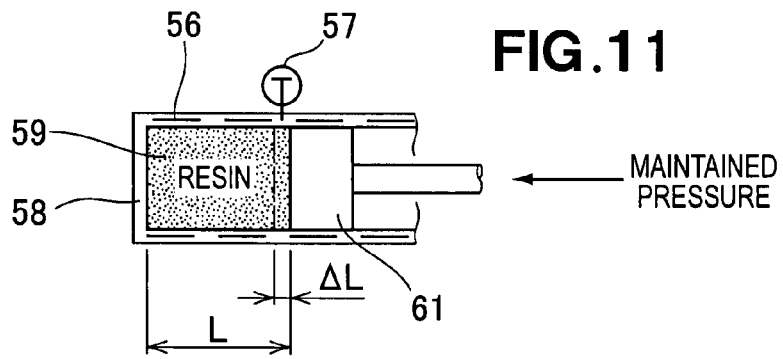
FIG. 11 is a schematic view showing the measurement of the resin compression quantity.

FIG. 11 is a diagram of an experimental model for measuring the compression quantity. A heating cylinder 58 (the nozzle of the heating cylinder 58 is blocked) provided with a heater 56 and a temperature sensor 57 is prepared, the heating cylinder 58 is set to 200° C., 215° C., or 230° C., the other conditions are kept constant, and a plasticized resin 59 is compressed by a piston 61. This compression is performed with a maintained pressure of 20 to 60 MPa. The resin is polypropylene (PP).

The resin 59 whose length was L prior to compression is assumed to compress by an amount equal to $\Delta L$ under the maintained pressure. When the cross-sectional area is constant, the compression quantity (compression ratio) can be calculated as $(\Delta L/L) \times 100(\%)$. The experimentally calculated compression quantities are shown in the graph of FIG. 12.

Figure 12:
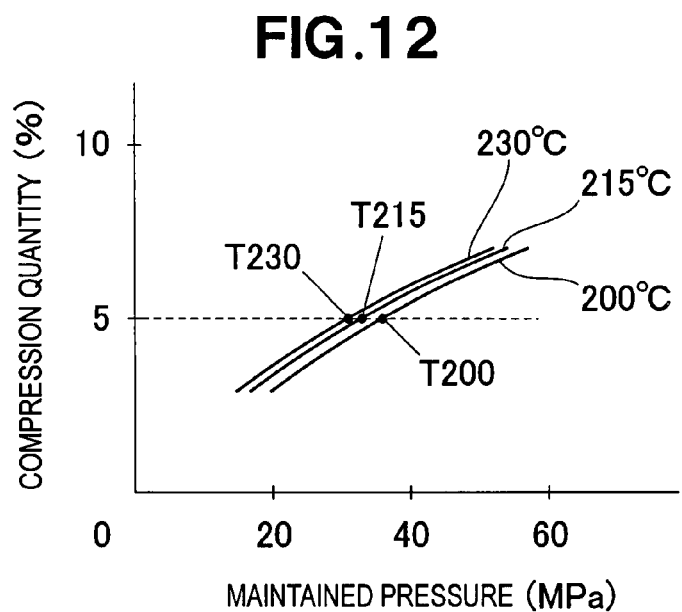
FIG. 12 is a graph showing a relationship between the maintained pressure and the compression quantity.

FIG. 12 is a graph showing the relationship between maintained pressure and the compression quantity. The compression quantity is small for the resin at 200° C., and the compression quantity is large for the resin at 230° C. Compression quantities were also found for the experiments of FIGS. 2 and 9. As a result, it was apparent that a satisfactory product is obtained when the compression quantity is 5%. The 5% line (dashed line) was therefore substituted into FIG. 12 to find the points T200, T215, and T230 of intersection with the three curves.

Figure 13:
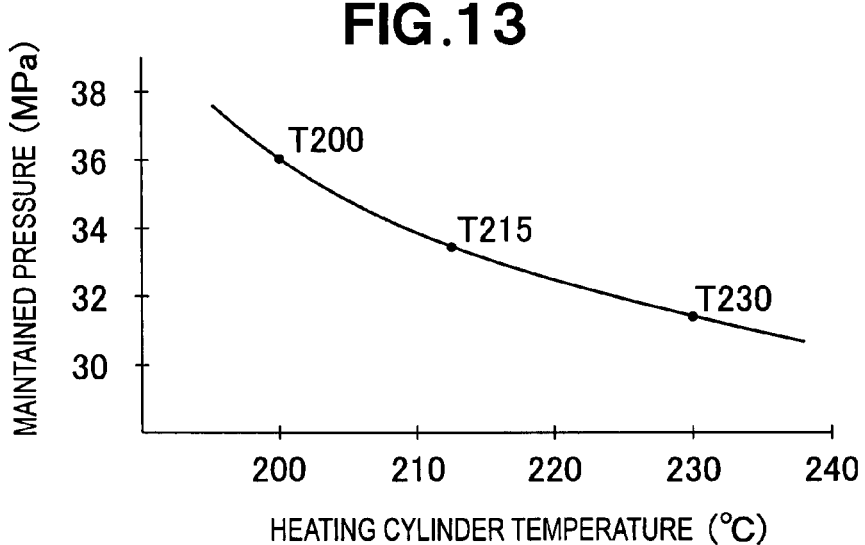
FIG. 13 is a graph showing a relationship between the heating cylinder temperature and the maintained pressure.

FIG. 13 is a graph showing the relationship between the heating cylinder temperature and the maintained pressure. The points T200, T215, and T230 obtained in FIG. 12 were plotted to create a graph that shows the relationship between the heating cylinder temperature and the maintained pressure.

Figure 14:
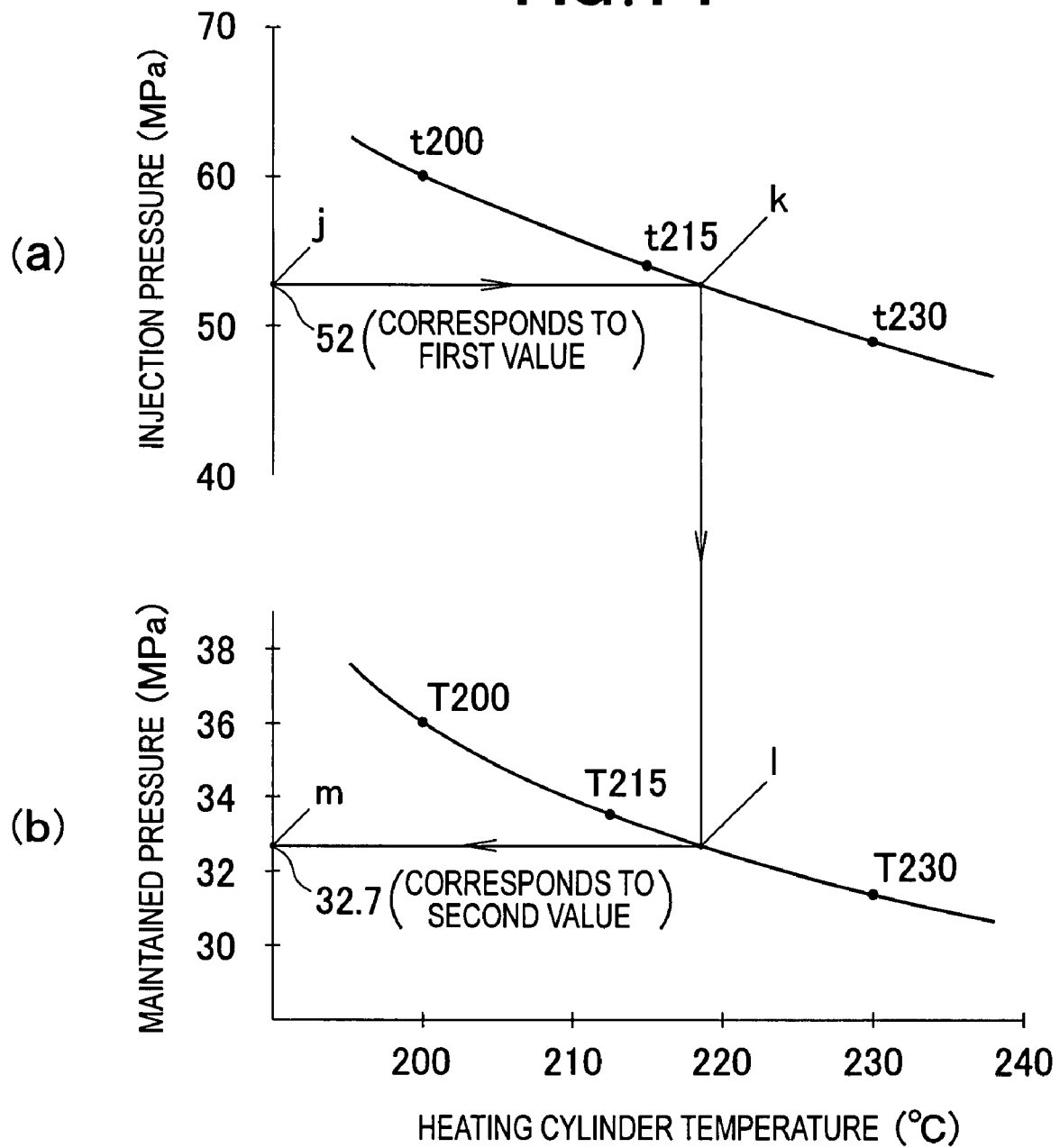
FIG. 14 is a graph showing the calculation of the maintained pressure from the injection pressure.

FIG. 14 is a graph whereby the maintained pressure can be calculated from the injection pressure. FIG. 14A corresponds to FIG. 10, and FIG. 14B corresponds to FIG. 13.

When the injection pressure is 52 MPa, a maintained pressure of 32.7 MPa can be obtained by drawing a line that links points j, k, l, and m.

The injection pressure of 52 MPa corresponds to the first value, and the maintained pressure of 32.7 MPa corresponds to the second value.

The operational flow of mass-production molding performed using FIG. 14 is described below.

Figure 15:
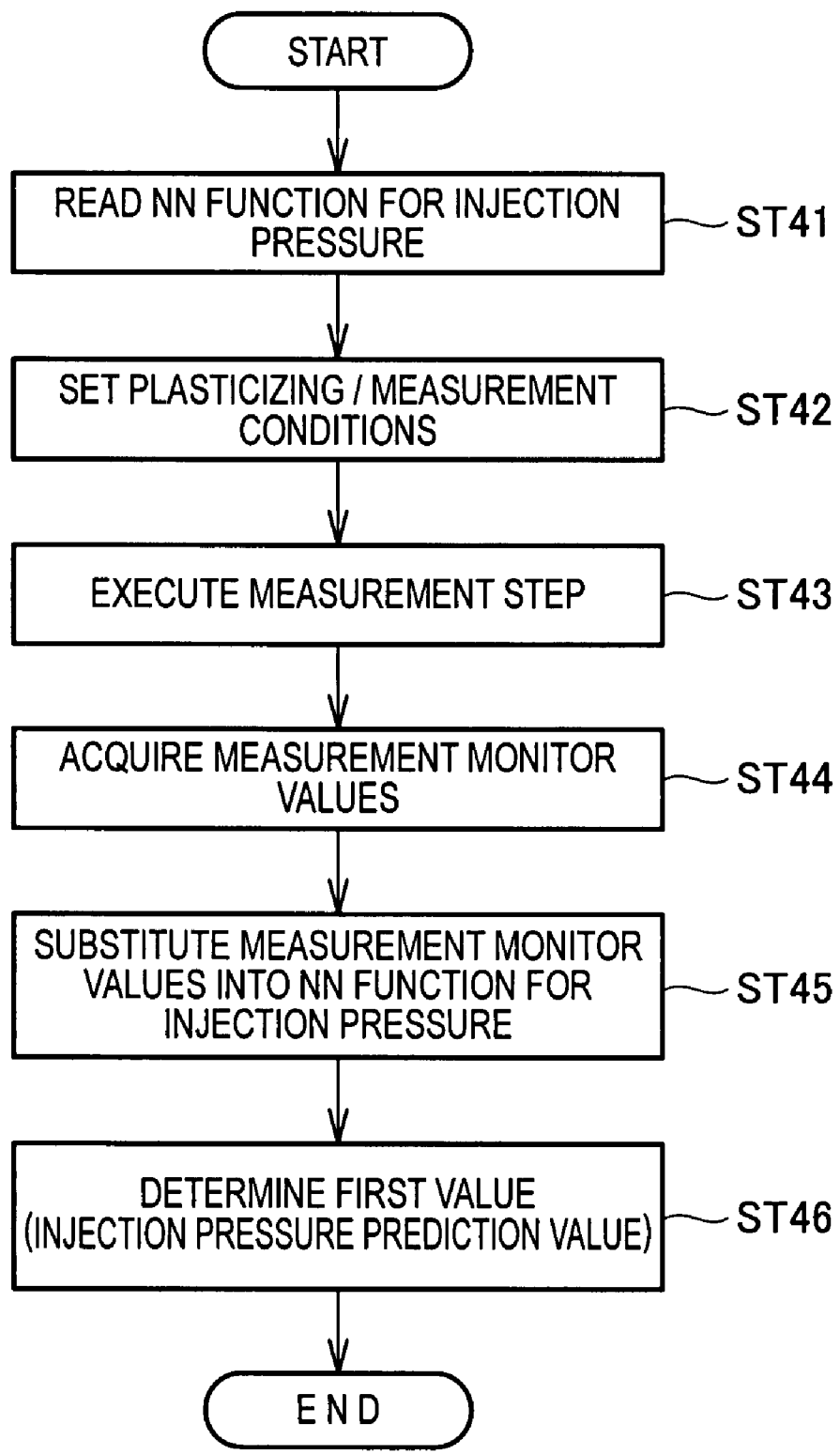
FIG. 15 is a flowchart showing the determination of the injection pressure prediction value that is the first value in mass-production molding.

FIG. 15 is a flow diagram showing the method for determining the first value in mass-production molding.

In ST41, the NN function for the injection pressure determined in ST08 (FIG. 3) is read.

In ST42, the plasticizing/measurement conditions are set for mass-production molding.

In ST43, the measurement step for mass-production molding is performed.

In ST44, the measurement monitor values are acquired at the end of the measurement step.

In ST45, the measurement monitor values are substituted into the NN function for the injection pressure. This step is described in FIG. 16.

In ST46, the first value (injection pressure prediction value; see point j in FIG. 14) is determined.

Figure 16:
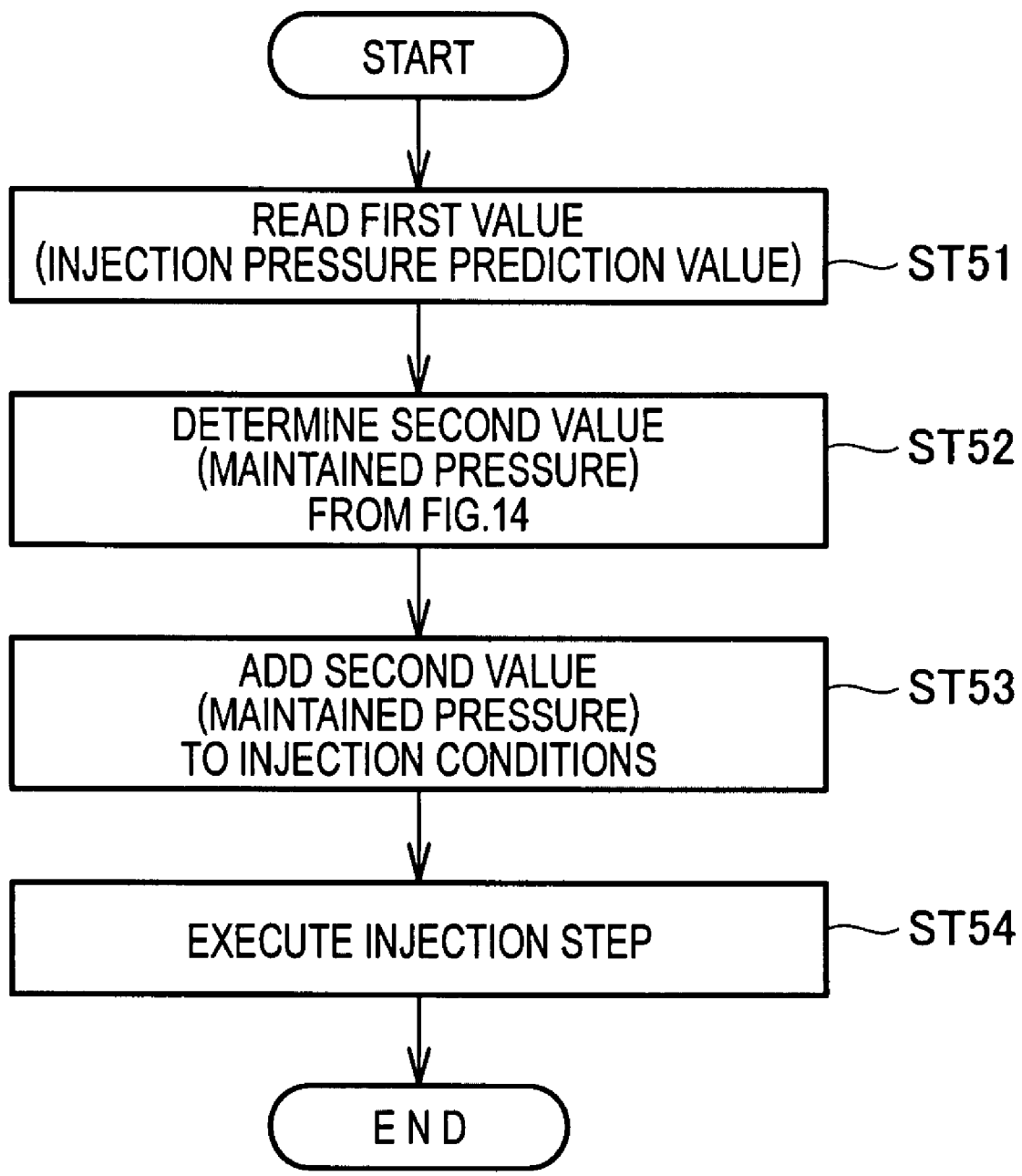
FIG. 16 is a flowchart showing the determination of the maintained pressure that is the second value in mass-production molding, and the execution of the injection step under the injection conditions.

FIG. 16 is a flow diagram showing the method for determining the maintained pressure in mass-production molding.

In ST51, the first value (injection pressure prediction value) is read.

In ST52, the second value (maintained pressure; see point m in FIG. 14A) is determined based on FIG. 14.

In ST53, the second value (maintained pressure) is added to the injection conditions. The injection step (ST54) is performed while the pressure is kept at the maintained pressure.

The measurement step in the mass-production molding is performed in FIG. 15 described above, and the injection step in mass-production molding is performed in FIG. 16, but repeated calculation and other calculation that takes time is not performed. Consequently, mass-production molding can be performed at high speed.

Figure 17:
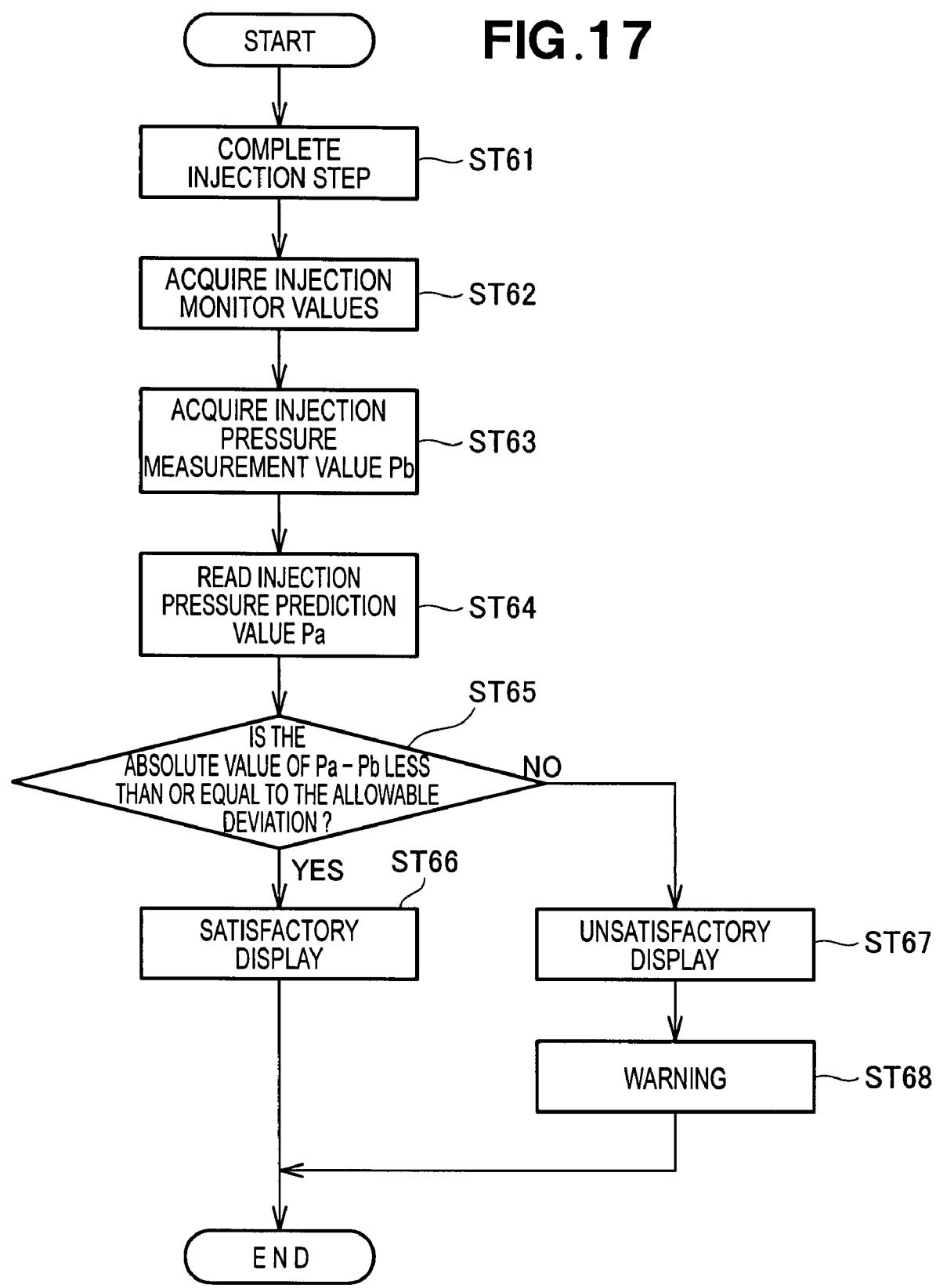
FIG. 17 is a flowchart showing the confirmation step in mass-production molding.
Figure 18:
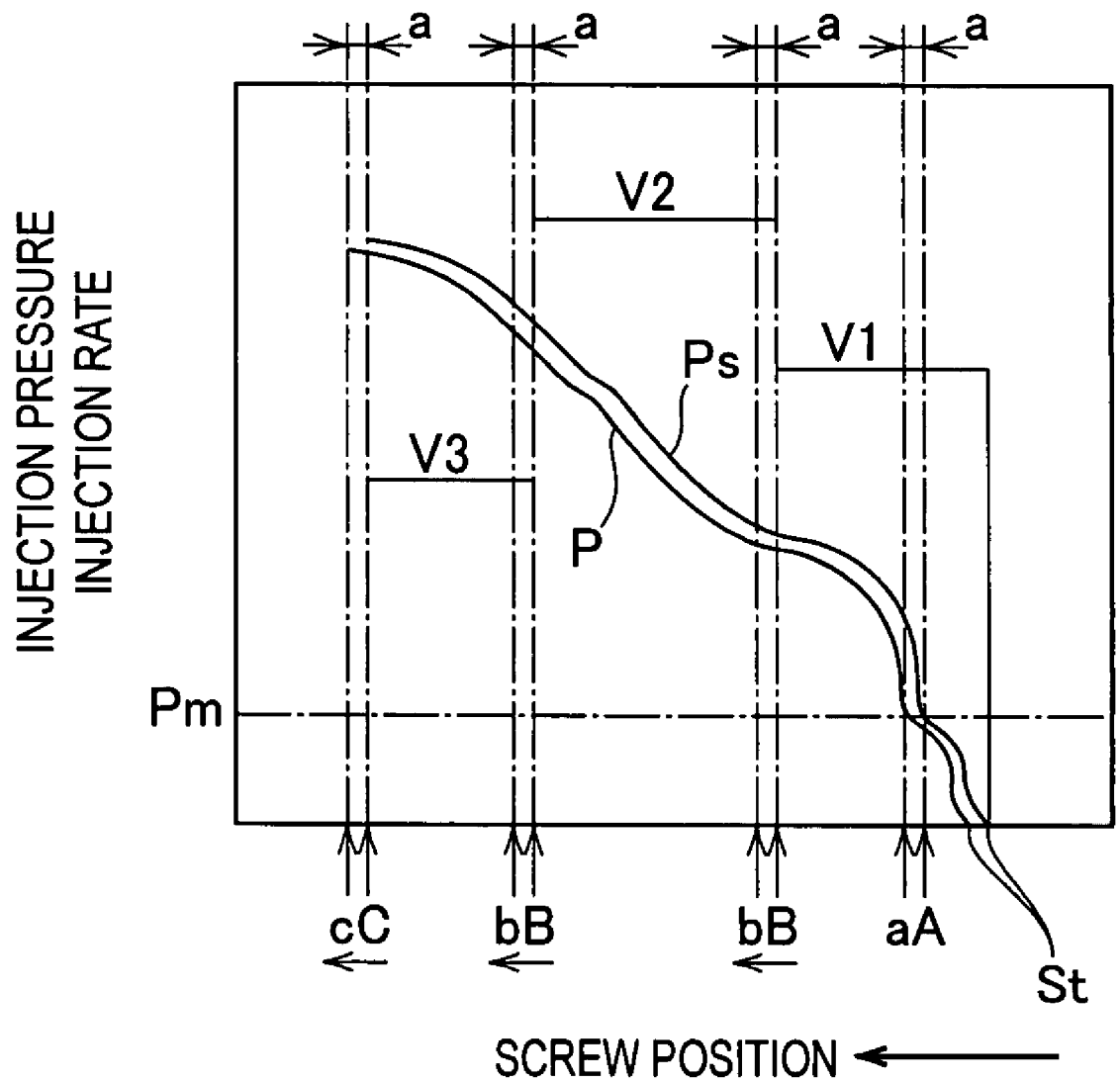
FIG. 18 is a graph showing a relationship between the injection rate and the injection pressure with respect to the screw position in a conventional injection molding.

FIG. 17 is a flow diagram showing the confirmation step in mass-production molding.

When the injection step is completed in ST61, the injection monitor values are acquired in ST62, and the injection pressure measurement value Pb is acquired in ST63 from among the injection monitor values.

In ST64, the injection pressure prediction value Pa that is the first value is read.

The difference between Pa and Pb is calculated in ST65, and an assessment is made as to whether the difference is within an allowable deviation. The process proceeds to ST66, and "satisfactory display" is performed when the difference is within the allowable deviation. When the difference exceeds the allowable deviation, the process proceeds to ST67, "unsatisfactory display" is performed, and a warning is generated in ST68.

The accuracy of the injection conditions is monitored by comparing the predicted first value with the injection monitor value that is acquired at the completion of the injection step.

According to the present invention as described above, the injection conditions (V-P switching position, maintained pressure, and other conditions) predicted for mass-production molding are determined prior to the injection step. Since there is no need for computation in the injection step, injection can be performed at high speed. The computations that accompany the first value prediction step and the second value prediction step are performed in a measurement step that has a time margin, and there is therefore no need to increase the computation speed, and the cost of the control device can be prevented from increasing. As a result, the present invention can be implemented by a control device that is mounted in a conventional injection molding machine, and the cost of the injection molding machine can be prevented from increasing.

A plurality of measurement monitor values can also be designated as input factors by employing a prediction function using a neural network. Specifically, injection conditions that reflect multiple fluctuating factors can be determined. As a result, improved quality can easily be attained in the manufactured product.

The measurement monitor value includes at least one of a measurement starting position, a measurement time, a measurement torque, a cycle time, a measurement stop position, and a heating cylinder temperature. Injection conditions that reflect multiple fluctuating factors can be determined. As a result, improved quality can easily be attained in the manufactured product.

The injection monitor value is preferably an injection starting position of the screw. The injection starting position of the screw is extremely important in the injection step. The quality of the manufactured product is improved by predicting such an injection starting position for the screw.

The second value of the present invention is preferably a V-P switching position at which speed control of the screw is switched to pressure control. The V-P switching position is extremely important in the injection step. The quality of the manufactured product is improved by predicting such a V-P switching position.

The injection monitor value may be an injection pressure measurement value measured when the screw has reached a prescribed position. When a backflow prevention valve is provided to the screw, the injection pressure is unstable until the backflow prevention valve closes. Therefore, the injection monitor value is the injection pressure measurement value when the screw reaches a prescribed position, and the pressure stably increases.

The second value of the present invention may be a maintained pressure for the pressure maintenance control. The maintained pressure is extremely important in the injection step. The quality of the manufactured product is improved by predicting such a maintained pressure.

The measurement monitor values, the injection monitor value, and the predicted injection conditions may be appropriately selected from conditions or values used by the injection molding machine, and these values are not limited by the examples described above.

Obviously, various minor changes and modifications of the present invention are possible in light of the above teaching. It is therefore to be understood that within the scope of the appended claims the invention may be practiced otherwise than as specifically described.

What is claimed is:

1. A method for controlling injection molding using a neural network in a control device of an injection molding machine, the injection molding control method comprising the steps of:
    acquiring a measurement monitor value in a measurement step during test injection molding and an injection monitor value in an injection step, designating the acquired measurement monitor value as an input term and the injection monitor value as an output term, and determining a prediction function using the neural network that incorporates the measurement monitor value;
    predicting a first value corresponding to the injection monitor value by substituting into the prediction function a measurement monitor value acquired at completion of a measurement step during mass-production injection molding;
    determining on the basis of the predicted first value a second value corresponding to an injection condition; and
    implementing injection control and pressure maintenance control on the basis of the second value corresponding to the injection condition;
    wherein the measurement monitor value in the test injection molding and the mass-production injection molding includes at least one of a measurement starting position corresponding to a screw position of a screw of the injection molding machine at the start of measurement, a measurement time corresponding to a time from the start of measurement to the end of measurement, a measurement torque corresponding to a twisting torque applied to the screw, a cycle time corresponding to a single cycle time from the start of measurement in a certain test molding to the start of measurement in a subsequent test molding, a measurement stop position corresponding to a screw position of the screw at the end of measurement, and a heating cylinder temperature corresponding to an average value of the heating cylinder temperature in a measurement.

2. A control method according to claim 1; wherein the injection monitor value is an injection starting position of a screw of the injection molding machine.

3. A control method according to claim 1; wherein the injection monitor value is an injection pressure measurement value measured when a screw of the injection molding machine has reached a prescribed position.

4. A control method according to claim 1; wherein the second value is a V-P switching position at which speed (V) control of a screw of the injection molding machine is switched to pressure (P) maintenance control.

5. A control method according to claim 1; wherein the second value is a maintained pressure for the pressure maintenance control.

6. A control method according to claim 1; further comprising the steps of comparing the predicted first value with an injection monitor value acquired at the end of an injection step during the mass-production injection molding, and confirming on the basis of the comparison whether a difference between the first and injection monitor values is within an allowable range.

7. A method for controlling injection molding using a neural network in a control device of an injection molding machine, the method comprising the steps of:
    acquiring a measurement monitor value and an injection monitor value of a test injection molding performed by the injection molding machine;
    generating a prediction function using a neural network that incorporates the acquired measurement monitor value and injection monitor value;
    computing a first value on the basis of the generated prediction function and a measurement monitor value of a mass-production injection molding performed by the injection molding machine;
    computing on the basis of the computed first value a second value corresponding to an injection condition; and
    implementing injection control and pressure maintenance control on the basis of the second value corresponding to the injection condition;
    wherein the measurement monitor value of each of the test injection molding and the mass-production infection molding includes at least one of a measurement start position corresponding to a position of a screw of the injection molding machine at the start of a measurement, a measurement time corresponding to a time from the start of the measurement to the end of the measurement, a measurement torque corresponding to a torque applied to the screw, a cycle time corresponding to a single cycle time from the time of measurement in one test injection molding to the start of measurement in a subsequent test infection molding, a measurement stop position corresponding to a screw position at the end of the measurement, and a heating cylinder temperature corresponding to a heating temperature of a heating cylinder of the injection molding machine.

8. A method according to claim 7; further comprising the steps of comparing the first value with an injection monitor value of the mass-production injection molding performed by the injection molding machine, and generating a warning signal when a resulting comparison value is not within an allowable range.

9. A method according to claim 7; wherein the injection monitor value is an injection starting position of a screw of the injection molding machine.

10. A method according to claim 7; wherein the injection monitor value is an injection pressure measurement value measured when a screw of the injection molding machine has reached a prescribed position.

11. A method according to claim 7; wherein the second value is a V-P switching position at which speed (V) control of a screw of the injection molding machine is switched to pressure (P) maintenance control.

12. A method according to claim 11; wherein the second value is a maintained pressure for the pressure maintenance control.

13. A method according to claim 7; further comprising the steps of comparing the computed first value with an injection monitor value acquired at the end of an injection step during the mass-production injection molding, and confirming on the basis of the comparison whether a difference between the first value and the injection monitor value is within an allowable range.

* * * * *